Aug. 29, 1944.  S. J. ROBINS  2,357,024
GAUGE
Filed Nov. 1, 1943
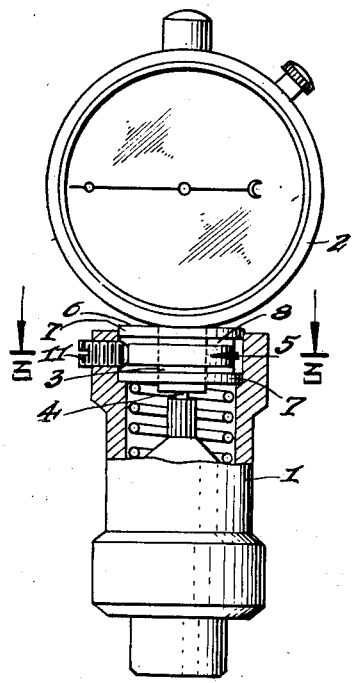
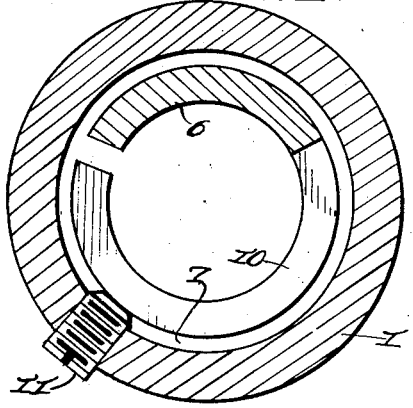
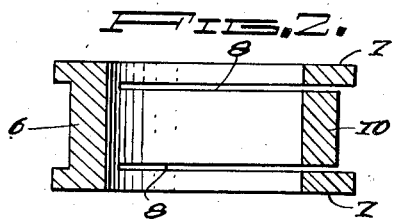
INVENTOR.
BY Stanley John Robins
Michaelis & Michaelis
ATTORNEYS Patented Aug. 29, 1944

2,357,024

UNITED STATES PATENT OFFICE 2,357,024

GAUGE

Stanley John Robins, New York, N. Y.

Application November 1, 1943, Serial No. 508,570

2 Claims. (Cl. 33—172)

This invention relates to gauges of the dial indicator type and has for one of its objects the provision of an improved gauge of this character, in which the sleeve fixed to the indicator housing and surrounding the indicator stem is rigidly mounted on the gauge body by means of a clamping device in a more effective manner than is the case in instruments of this kind as hitherto constructed.

In the drawing affixed to this specification and forming part thereof an embodiment of my invention is illustrated diagrammatically by way of example.

In the drawing

Fig. 1 is a view, partly in elevation and partly in axial section, of a gauge comprising the invention.

Fig. 2 is an axial section, drawn to a larger scale, of the new clamping device, and Fig. 3 is a large scale horizontal section of this device on the line 3—3 in Fig. 1.

Referring to the drawing and first to Fig. 1, I is the hollow gauge body, 2 is the indicator housing, 3 is the sleeve fixed to this housing, 4 is the indicator stem extending from the gauge body across the sleeve into the indicator housing and 5 is the clamping device seated in the gauge body and surrounding the sleeve 3.

The clamping device which is shown in detail in Figs. 2 and 3 is a ring or cylinder 6 formed at both ends with outwardly extending flanges 7 and with two incisions 8 adjacent and parallel to these flanges and extending from one side of the axial slot 9 half way or more across the cylindrical wall substantially at right angles to the cylinder axis. The body section between the two incisions 8 forms a tongue 10 capable of yielding to pressure applied near its end.

As shown in Fig. 1 the device above described is seated in the gauge body with the set screw 11 abutting against the free end of the tongue 10, close to the lower flange. It thus exerts a bending effect on the tongue and at the seame time holds the whole clamping device down on its seat. Its pressure tends to decrease the radius of curvature of the tongue, thereby pressing it around the sleeve 3. Owing to the spring-back of the tongue this sleeve is released as soon as the screw is loosened again.

The rigid flanges render the device very strong and the fact that it is formed in one piece with the tongue, renders it superior to clamping means comprising loose parts which get easily lost. The lower flange also acts towards retaining the device in the gauge body.

I wish it to be understood that I do not desire to be limited to the details shown and described, for obvious modifications will appear to a person skilled in the art.

I claim:

1. In a gauge of the dial indicator type the combination of a hollow gauge body, a dial indicator and a sleeve extending from said indicator and into the top part of said body, with a cylindrical body seated in the top part of said body and surrounding said sleeve, a tongue being formed in the wall of said cylindrical body by two incisions extending substantially at right angles to the cylinder axis and another incision connecting said two incisions, and a set screw in said gauge body arranged for exerting pressure on said tongue.

2. The combination of claim 1, in which flanges extend from the wall of said cylinder body above and below said parallel incisions.

STANLEY JOHN ROBINS.